(12) United States Patent
Weinstein

(10) Patent No.: US 6,372,060 B1
(45) Date of Patent: Apr. 16, 2002

(54) PLATINUM SOLDER

(75) Inventor: Keith Weinstein, 4316 Marina City Dr., #429 Marina Del Rey, CA (US) 90292

(73) Assignee: Keith Weinstein, Los Angeles, CA (US)

( * ) Notice: Subject to any disclaimer, the term of this patent is extended or adjusted under 35 U.S.C. 154(b) by 0 days.

(21) Appl. No.: 09/503,419

(22) Filed: Feb. 14, 2000

(51) Int. Cl.[7] .............................. C22C 5/04; C22C 28/00
(52) U.S. Cl. ........................ 148/430; 420/466; 420/555
(58) Field of Search ................................ 420/466, 555; 148/430

(56) References Cited

U.S. PATENT DOCUMENTS

| | | | | |
|---|---|---|---|---|
| 4,165,983 A | * | 8/1979 | Bourne et al. | 420/466 |
| 4,398,975 A | * | 8/1983 | Oshawa et al. | 420/555 |
| 5,508,003 A | * | 4/1996 | Rancourt et al. | 420/555 |
| 5,846,352 A | * | 12/1998 | Kretchmer | 148/430 |

* cited by examiner

*Primary Examiner*—George Wyszomierski
(74) *Attorney, Agent, or Firm*—Oppenheimer, Wolff & Donnelly, LLP

(57) ABSTRACT

A solder composition for repairing jewelry having a platinum content of up to about 95% by weight contains about 90% to about 95% by weight platinum and about 5% to about 10% by weight of an alloy that provides the solder composition with a melting temperature in a range from about 1300° C. to about 1500° C. Preferably, the alloy consists essentially of about 3% to about 6% by weight gallium, about 1.5% to about 3% by weight indium, and about 0.5% to about 1.0% by weight copper. An alloy for lowering the melting point of platinum to provide a solder composition having a reduced melting point contains gallium, indium and copper in a respective weight ratio of approximately 6:3:1. The solder composition is used to assemble, repair, or size high platinum content jewelry at a workable melting temperature without creating a color difference between the jewelry and the applied solder composition.

13 Claims, No Drawings

PLATINUM SOLDER

BACKGROUND OF THE INVENTION

1. Field of the Invention

The present invention relates to a solder composition and, more particularly, to a solder composition for assembling, repairing and/or sizing jewelry having a platinum content of up to about 95% by weight.

2. Description of the Related Art

A variety of solder compositions are known in the art for repairing platinum jewelry. These prior art compositions are characterized by melting temperatures ranging from about 1000° C. to about 1700° C. and consist essentially of varying relative amounts by weight of gold, silver and/or palladium. The higher melting temperature solder compositions (16000 and 1700° C.) are difficult to work with and have melting temperatures that are not significantly lower than the melting temperature of pure platinum (1769° C.). While the lower melting temperature compositions are easier to work with than the higher melting temperature compositions, all of the compositions are problematic when used to repair platinum jewelry having a platinum content of at least 90% by weight. Specifically, the color of the solder composition does not match the color of the high platinum content jewelry. This results in an unsightly dark seam or spot of solder that must be temporarily masked by plating the seam or spot with rhodium. In addition to adding to the cost and complexity of the jewelry repair, the rhodium plating is also subject to wear over time, whereupon the color difference between the platinum jewelry and the solder composition becomes visible again. Moreover, pitting of the solder at its point of application to the jewelry is often observed, thus further detracting from the appearance of the repaired jewelry.

It is known to add minor amounts of platinum (up to about 5% by weight) to the above-noted solder compositions, but the problems of color matching and pitting still persist. Solder compositions combining palladium and up to 75% by weight platinum have also been employed, but such compositions are characterized by high melting temperatures (1600° to 1700° C.) that are not significantly lower than the 1769° C. melting temperature of platinum itself and make the compositions difficult to work with. Additionally, color matching and pitting problems still occur.

Various high platinum content jewelry materials are known in the art. For example, U.S. Pat. No. 4,165,983 discloses an alloy for fabricating jewelry containing at least 95% by weight platinum, 1.5% to 3.5% by weight gallium, and a balance of at least one of indium, gold, palladium, silver, copper, cobalt, nickel, ruthenium, iridium and rhodium. U.S. Pat. No. 5,846,352 discloses a heat-treated platinum-gallium alloy for fabricating jewelry containing 1% to 9% by weight gallium and a small amount of palladium. However, such alloys are intended for fabricating the jewelry itself. Neither of these patents disclose or suggest particular solder compositions that would be useful for repairing platinum jewelry, and particularly platinum jewelry having a platinum content of up to about 95% by weight.

Currently, there are no known solder compositions or platinum alloys with low flow temperatures that can be used for repairing jewelry having a platinum content of at least 90% by weight without incurring the above-mentioned problems. Accordingly, the development of a solder composition for such platinum jewelry that does not involve the aforementioned problems would be a significant advance in the art.

SUMMARY OF THE PREFERRED EMBODIMENTS

The present invention is directed to a solder composition that can be used for assembling, repairing, and/or sizing jewelry having a platinum content of up to about 95% by weight. In accordance with the invention, such a solder composition consists essentially of about 90% to about 95% by weight platinum and about 5% to about 10% by weight of an alloy that provides the solder composition with a melting temperature in a range from about 1300° C. to about 1500° C.

In accordance with one preferred aspect of the present invention, a solder composition for assembling, repairing, and/or sizing jewelry consists essentially of about 90% to about 95% by weight platinum, about 3% to about 6% by weight gallium, about 1.5% to about 3% by weight indium, and about 0.5% to about 1.0% by weight copper. In accordance with another preferred aspect of the present invention, a solder composition for assembling, repairing and/or sizing jewelry consists essentially of about 90% to about 95% by weight platinum and about 5% to about 10% by weight of an alloy consisting of gallium, indium and copper in a respective weight ratio of approximately 6:3:1. In accordance with yet another preferred aspect of the present invention, there is provided an alloy for lowering the melting point of platinum when combined therewith to provide a solder composition having a reduced melting temperature, the alloy consisting essentially of about 60% by weight gallium, about 30% by weight indium and about 10% by weight copper.

Further in accordance with the present invention, there is also provided a method of soldering jewelry containing up to about 95% by weight platinum. The method comprises the step of soldering a piece of jewelry containing up to about 95% by weight platinum with a solder composition consisting essentially of about 90% to about 95% by weight platinum and about 5% to about 10% by weight of an alloy that provides the solder composition with a melting temperature in a range from about 1300° C. to about 1500° C. In a preferred aspect of the inventive method, the solder composition consists essentially of about 90% to about 95% by weight platinum, about 3% to about 6% by weight gallium, about 1.5% to about 3% by weight indium, and about 0.5% to about 1.0% by weight copper.

DETAILED DESCRIPTION OF THE PREFERRED EMBODIMENTS

The present invention provides a solder that is not only easy and safe to use, due to a relatively low flow temperature of 1300° C. to 1500° C. in relation to the melting temperature of platinum (1769° C.), but that also, in use, matches the color of platinum jewelry having a platinum content up to about 95% by weight. These advantages have not previously been found together in a solder composition for platinum jewelry.

In accordance with the present invention, a solder composition containing about 90% to about 95% by weight platinum combined with an alloy that reduces the melting temperature of the solder composition to about 1300° C. to about 1500° C. eliminates the disadvantages associated with prior art solder compositions for platinum jewelry.

The preferred solder compositions of the present invention contain about 90% to about 95% by weight platinum. The platinum content of the solder composition insures a color match with platinum jewelry containing up to about 95% by weight platinum. It has been found that solder compositions having a platinum content of about 87.5% by weight are unsatisfactory for use in the present invention. In this regard, solder compositions with a platinum content of about 87.5% by weight are too brittle or "ceramic" to roll and fabricate into useful solders. They turn to dust. Conversely, it has been found that solder compositions having a platinum content above 95% by weight can result in useful solders. However, such compositions arc extremely hard and possessed of higher melting temperatures, which increase the risk of damage to the platinum jewelry they are used in conjunction with.

The preferred solder compositions of the present invention also contain about 5% to about 10% by weight of an alloy that reduces the melting temperature of the solder composition to about 1300° C. to about 1500° C. In this regard, the melting temperature of pure platinum is 1769° C. Accordingly, the alloy reduces the melting temperature of the solder composition sufficiently to facilitate its use while avoiding potential damage to the platinum jewelry.

It has been found that a suitable alloy for use in the present invention is an alloy consisting essentially of about 3% to about 6% gallium, about 1.5% to about 3% indium, and about 0.5% to about 1.0% copper, where all percentages are by weight of the solder composition. A particularly preferred alloy according to the present invention consists essentially of gallium, indium and copper in a respective weight ratio of approximately 6:3:1, or 60% by weight gallium, 30% by weight indium, and 10% by weight copper.

The solder compositions of the present invention provide advantages previously unattained in known solder compositions for high platinum content jewelry.

A primary advantage of the solder compositions of the present invention is accurate color matching between the solder and the platinum jewelry. In this regard, the color of the disclosed solder compositions matches the color of high platinum content jewelry. Old formula solders result in a color difference between the solder and the jewelry in the form of a dark scam or spot that damages the look of the jewelry and requires rhodium plating to mask the spot. Rhodium plating adds to the complexity and cost of a jewelry repair or assembly job. Moreover, rhodium plating wears off, whereupon the discolored spot appears again and creates an unsightly appearance in the jewelry. The solders of the present invention eliminate dark color and other color difference problems heretofore associated with the repair of high platinum content jewelry, e.g., platinum jewelry containing up to about 95% by weight platinum.

Additionally, it has been found that the solders of the present invention result in less pitting on the joint or spot where the solder is used in relation to prior known solder compositions for platinum jewelry.

The solders of the present invention flow at 1500° C. or less, which is much lower than the flow temperature of high platinum content jewelry. Accordingly, 90% to 95% by weight platinum solders arc provided that flow at low, workable temperatures. Sizing, assembly and many repairs can be performed on high platinum content jewelry without risk to the integrity of the platinum jewelry itself. Even platinum findings and settings can be assembled with the solder.

The solders of the present invention do not create any problems by polishing out, since the hardness of the solders approximates the hardness of most common platinum alloys. Thus, it is possible to polish assembled, sized or repaired platinum jewelry to smooth and brighten the jewelry without adversely affecting the advantageously obtained color matching. Polishing of prior art solder compositions for platinum jewelry result in a noticeable residual line or dark spot evidencing the color difference between the jewelry and the solder used on the jewelry. Moreover, the disclosed solders work equally well when used in conjunction with not only conventional platinum but also cobalt/platinum alloys. Further, the solders are free of cadmium, thus avoiding known hazards associated with the use of cadmium in solder compositions.

The solders of the present invention arc prepared by melting the platinum and alloy together in specified amounts by any conventional method, e.g., by the known hot torch or electric methods, followed by quenching, rolling and annealing to provide softness to the solder. A hot torch method is preferred. The solder can be manufactured and provided for use in any known form. Such forms include, for example, flat sheets of 0.2 mm thickness and predetermined weight and dimension, 1 mm diameter round wire, or a paste solder.

The solders of the present invention are ideally used in a method for the assembly, repair, or sizing of jewelry containing up to about 95% by weight platinum. Such methods per se are well known in the art. The particular method of the present invention involves soldering a piece of jewelry containing up to about 95% by weight platinum with a solder composition consisting essentially of about 90% to about 95% by weight platinum and about 5% to about 10% by weight of an alloy that provides the solder composition with a melting temperature in a range from about 1300° C. to about 1500° C.

The soldering step of the present invention can take place during the assembly, repair and/or sizing of a piece of high platinum content jewelry. A piece of the solder (e.g., 0.2 mm thickness) is cut to a desired size (e.g., 1 mm×1 mm), placed with tongs at the desired location on the jewelry, and then melted with a hot torch, whereupon the solder flows into the desired area on the jewelry. Upon removal of the hot torch, the solder rapidly cools, hardens and solidifies.

The potential applications of such a method are many. Thus, for example, a ring from inventory can be adjusted by sizing to a larger or smaller size to fit the finger of a given customer. The solder used to adjust the ring size will match perfectly in color with the color of the original ring. No scams or dark spots are observed at the interface between the solder and the ring. As another example, the solder can be used in jewelry repair jobs, e.g., when replacing a damaged or broken platinum prong on a diamond ring (known as retipping). The solder used in the retipping procedure will match perfectly in color with the color of the ring itself and no dark spots or scams are observed at the solder-jewelry interface. As a final example, the solder can be used in a desired manner during the original assembly of high platinum content jewelry items. The solder matches perfectly in color with the color of the platinum jewelry. No color differences result.

The following Examples 1 to 5 illustrate preferred embodiments of the solder compositions of the present invention, and the method of making and using such solder compositions. Comparative Examples 1 to 5 illustrate known solder compositions for repairing platinum jewelry.

EXAMPLE 1

A "hard" plumb platinum solder (melting temperature of approximately 1500° C.) is prepared by annealing and rolling. A bar of a solder composition (5.3 mm×0.75 inches; weight of 125 dwt.) consisting of 95% by weight platinum, 3.0% by weight gallium, 1.5% by weight indium, and 0.5% by weight copper is cast with hydrogen and oxygen in an iron upright ingot mold and then quenched in cold water at 40° F. The bar is then rolled from 5.3 mm to 1.5 mm, annealed on each side for 5 minutes at 1600° F., and quenched in cold water at 40° F. The bar is rolled again from 1.5 mm to 0.2 mm and quenched again in cold water at 40° F. The solder is then finished in a conventional manner by cutting the 0.2 mm strip into pieces of approximately 1.15 dwt. each, which are then each trimmed to 1 dwt. pieces and individually hand-stamped for identification.

This solder is then used in an otherwise known manner to assemble and/or repair jewelry containing from about 90% to about 95% by weight platinum. The melting temperature of the solder (approximately 1500° C.) makes it relatively easy to work with. The color of the solder matches well with the jewelry and does not require any further processing. Additionally, there is no pitting observed on the spot where the solder is used. Occasionally, however, the solder is "too white" to perfectly match the color of jewelry containing 90% by weight platinum.

EXAMPLE 2

A "medium" plumb platinum solder (melting temperature of approximately 1400° C.) is prepared by annealing and rolling in the identical manner to that described in Example 1. The initial solder composition (5.3 mm×0.75 inches; weight of 125 dwt.) consists of 92.5% by weight platinum, 4.5% by weight gallium, 2.25% by weight indium, and 0.7% by weight copper.

This solder is then used to assemble and/or repair jewelry containing from about 90% to about 95% by weight platinum. The melting temperature of the solder (approximately 1400° C.) makes it even easier to work with than the solder of Example 1. The color of the solder matches well with the jewelry and does not require any further processing. Additionally, there is no pitting observed on the spot where the solder is used.

EXAMPLE 3

An "easy" plumb platinum solder (melting temperature of approximately 1300° C.) is prepared by annealing and rolling. A bar of a solder composition (4.3 mm×17 mm; weight of 80 dwt.) consisting of 90% by weight platinum, 6.0% by weight gallium, 3.0% by weight indium, and 1.0% by weight copper is cast with hydrogen and oxygen in an iron upright ingot mold and then quenched in cold water at 40° F. The bar is then rolled from 4.3 mm to 4.2 mm, annealed on each side for 5 minutes at 1600° F., and quenched in cold water at 40° F. This rolling, annealing and quenching cycle of steps is repeated numerous times to incrementally reduce the bar from 4.2 mm to 4.0 mm, from 4.0 mm to 3.9 mm, from 3.9 mm to 3.8 mm, from 3.8 mm to 3.7 mm, from 3.7 mm to 3.5 mm, from 3.5 mm to 3.4 mm, from 3.4 mm to 3.0 mm (annealing temperature reduced here to 1400° F.), from 3.0 mm to 2.5mm, from 2.5 mm to 2.0 mm (annealing temperature reduced here to 1300° F.), from 2.0 mm to 1.3 mm, from 1.3 mm to 0.6 mm (annealing temperature reduced here to 1100° F.), from 0.6 mm to 0.4 mm, and finally from 0.4 nun to 0.2 mm. While cracking of the bar is observed during the multi-step rolling from 4.0 mm to 2.0 mm, this cracking is ignored and does not affect the final solder composition. The solder is then finished in a conventional manner by cutting into 0.2 mm pieces of approximately 1.15 dwt. each, which are then each trimmed to 1 dwt. pieces and individually hand-stamped for identification.

This solder is then used to assemble and/or repair jewelry containing from about 90% to about 95% by weight platinum. The melting temperature of the solder (approximately 1300° C.) makes it easy to work with, and easier than the solders of Examples 1 and 2. The color of the solder matches well with the jewelry and does not require any further processing. Additionally, there is no pitting observed on the spot where the solder is used.

EXAMPLE 4

A "medium-hard" plumb platinum solder (melting temperature of between approximately 1400° C. and approximately 1500° C.) is prepared by annealing and rolling. A bar of a solder composition (5.3 mm×0.75 inches; weight of 125 dwt.) consisting of 94% by weight platinum, 3.6% by weight gallium, 1.8% by weight indium, and 0.6% by weight copper is cast with hydrogen and oxygen in an iron upright ingot mold and then quenched in cold water at 40° F. The bar is then rolled from 5.3 mm to 1.5 mm, annealed on each side for 5 minutes at 1600° F., and quenched in cold water at 40° F. The bar is rolled again from 1.5 mm to 0.2 mm and quenched again in cold water at 40° F. The solder is then finished in a conventional manner by cutting the 0.2 mm strip into pieces of approximately 1.15 dwt. each, which are then each trimmed to 1 dwt. pieces and individually hand-stamped for identification.

This solder is then used to assemble and/or repair jewelry containing from about 90% to about 95% by weight platinum. The melting temperature of the solder (between approximately 1400>C. and 1500° C.) makes it relatively easy to work with. The color of the solder matches well with the jewelry and does not require any further processing. Additionally, there is no pitting observed on the spot where the solder is used.

EXAMPLE 5

The solder compositions of Examples 1 to 3 are utilized in a step-assembly of high platinum content jewelry. First, the "hard" plumb platinum solder of Example 1 (melting temperature of 1500° C.) is used to size a 95% by weight platinum ring to fit the finger of a particular customer. Second, the "medium" plumb platinum solder of is Example 2 (melting temperature of 1400° C.) is used to repair the ring by filling in an observed hole in the body of the ring. This is accomplished at a temperature (1400° C.) that does not melt the solder used in the first sizing step and cause it to fall out. Finally, the "easy" plumb platinum solder of Example 3 (melting temperature of 1300° C.) is used to provide a replacement prong for a defective prong that constitutes part of a setting for a diamond on the ring. Again, this retipping step is accomplished at a lower temperature (1300° C.) that will not adversely affect the prior two soldering procedures.

COMPARATIVE EXAMPLE 1

A series of known solder compositions for platinum having a melting point of approximately 1300° C. are prepared in known manner. These compositions consist of about 77% to about 80% by weight gold and about 20% to about 23% palladium. These solders are then used in a known manner to repair jewelry containing from about 90% to about 95% by weight platinum. The color of these solders does not match well with the jewelry and the solders must be rhodium-plated to achieve a temporary color match with the jewelry subject to wear over time. Additionally, pitting is observed on the spot where the solder is used.

COMPARATIVE EXAMPLE 2

A series of known solder compositions for platinum having a melting point of approximately 1400° C. are prepared in known manner. These compositions consist of about 65% to about 74% by weight gold, about 26.5% to about 30% by weight palladium, and 0% to about 5% by weight platinum. These solders are then used in a known manner to repair jewelry containing from about 90% to about 95% by weight platinum. The color of these solders does not match well with the jewelry and the solders must be rhodium-plated to achieve a temporary color match with the jewelry subject to wear over time. Additionally, pitting is observed on the spot where the solder is used.

COMPARATIVE EXAMPLE 3

A series of known solder compositions for platinum having a melting point of approximately 1500° C. are prepared in known manner. These compositions consist of about 59% to about 70% by weight gold, about 30% to about 39% by weight palladium, and 0% to about 3% by weight platinum. These solders are then used in a known manner to repair jewelry containing from about 90% to about 95% by weight platinum. The color of these solders does not match well with the jewelry and the solders must be rhodium-plated to achieve a temporary color match with the jewelry subject to wear over time. Additionally, pining is observed on the spot where the solder is used.

COMPARATIVE EXAMPLE 4

A series of known solder compositions for platinum are prepared in known manner. These compositions consist of about 25% to about 92.5% by weight palladium, about 7.5% to about 75% by weight platinum, and 0% to about 30% by weight gold. These solders are then used in a known manner to repair jewelry containing from about 90% to about 95% by weight platinum. The melting temperatures of these solders range from 1600° C. to about 1700° C. and accordingly are difficult to work with as solder compositions. Additionally, the color of these solders does not match well with the jewelry and the solders must be rhodium-plated to achieve a temporary color match with the jewelry subject to wear over time. Finally, pitting is observed on the spot where the solder is used.

COMPARATIVE EXAMPLE 5

A series of known solder compositions for platinum are prepared in known manner. These compositions consist of about 40% to about 63% by weight gold, about 23% to about 59% by weight silver, 0% to about 12% by weight palladium, 0% to about 7% by weight platinum, and 0% to about 0.33% by weight copper. These solders are then used in a known manner to repair jewelry containing from about 90% to about 95% by weight platinum. The melting temperatures of these solders range from about 1000° C. to about 1200° C., making the solders easy to work with. However, the color of these solders does not match well with the jewelry and the solders must be rhodium-plated to achieve a temporary color match with the jewelry subject to wear over time. Additionally, pitting is observed on the spot where the solder is used.

While the present invention has been disclosed and described with respect to particular and preferred embodiments, various modifications and alternatives will be apparent and will suggest themselves to those of ordinary skill in the art. Such modifications and alternatives do not depart from and are within the spirit and scope of the present invention, which is only to be limited as set forth in the appended claims.

What is claimed is:

1. A solder composition for soldering jewelry being assembling, repairing or sizing jewelry consisting essentially of about 90% to about 95% by weight platinum, about 3% to about 6% by weight gallium, about 1.5% to about 3% by weight indium, and about 0.5% to about 1.0% by weight copper, wherein the solder composition has a melting temperature in a range from about 1300° C. to about 1500° C.

2. A solder composition according to claim 1, consisting essentially of about 95% by weight platinum, about 3% by weight gallium, about 1.5% by weight indium, and about 0.5% by weight copper.

3. A solder composition According to claim 1, consisting essentially of about 94% by weight platinum, about 3.6% by weight gallium, about 1.9% by weight indium, and about 0.6% by weight copper.

4. A solder composition according to claim 1, consisting essentially of about 92.5% by weight platinum, about 4.5% by weight gallium, about 2.25% by weight indium, and about 0.7% by weight copper.

5. A solder composition according to claim 1, consisting essentially of about 90% by weight platinum, about 6.0% by weight gallium, about 3.0% by weight indium, and about 1.0% by weight copper.

6. A solder composition for assembling, repairing or sizing jewelry consisting essentially of about 90% to about 95% by weight platinum and about 5% to about 10% by weight of an alloy consisting of gallium, indium and copper in a respective weight ratio of approximately 6:3:1.

7. A solder composition according to claim 6, consisting essentially of about 95% by weight platinum and about 5% by weight of an alloy consisting of gallium, indium and copper in a respective weight ratio of approximately 6:3:1.

8. A solder composition according to claim 6, consisting essentially of about 92.5% by weight platinum and about 7.5% by weight of an alloy consisting of gallium, indium and copper in a respective weight ratio of approximately 6:3:1.

9. A solder composition according to claim 6, consisting essentially of about 90% by weight platinum and about 10% by weight of an alloy consisting of gallium, indium and copper in a respective weight ratio of approximately 6:3:1.

10. A solder composition according to claim 6, wherein the solder composition has a melting temperature in a range from about 1300° C. to about 1500° C.

11. A solder composition for assembling, repairing or sizing jewelry consisting essentially of about 90% to about 95% by weight platinum and the balance comprising of about 5% to about 10% by weight of an alloy including gallium, indium and copper that provides a solder composition with a melting temperature in a range from about 1300° C. to about 1500° C.

12. An alloy for lowering the melting point of platinum when combined therewith to provide a solder having a reduced melting point, the alloy consisting essentially of about 60% by weight gallium, about 30% by weight indium and about 10% by weight copper.

13. The solder composition for soldering jewelry including assembling, repairing or sizing jewelry consisting essentially of about 90% to about 95% by weight platinum and the balance comprising of about 3.6% to 6% by weight gallium and the remainder being comprised of indium and copper, wherein the solder composition has a melting temperature in a range of about 1300° C. to about 150° C.

* * * * *